Figure 1A:
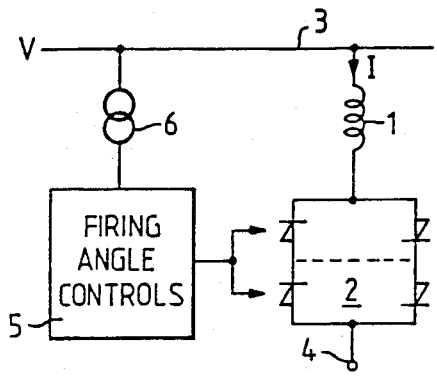

United States Patent [19]

Thanawala

[11] Patent Number: 4,503,380
[45] Date of Patent: Mar. 5, 1985

[54] STATIC REACTIVE COMPENSATOR

[75] Inventor: Hemesh L. Thanawala, Stafford, England

[73] Assignee: Associated Electrical Industries Limited, England

[21] Appl. No.: 476,958
[22] PCT Filed: Jun. 25, 1982
[86] PCT No.: PCT/GB82/00186
   § 371 Date: Feb. 25, 1983
   § 102(e) Date: Feb. 25, 1983
[87] PCT Pub. No.: WO83/00071
   PCT Pub. Date: Jan. 6, 1983

[30] Foreign Application Priority Data
Jun. 25, 1981 [GB] United Kingdom ............... 8119611

[51] Int. Cl.³ .................................................. G05F 1/70
[52] U.S. Cl. ..................................... 323/206; 323/210
[58] Field of Search ............................... 323/206–211, 323/214, 249, 254–255, 257–258, 340, 343, 356; 363/39, 45–48; 37/102–103; 333/12, 165, 167, 177

[56] References Cited
U.S. PATENT DOCUMENTS

| 3,195,038 | 7/1965 | Fry | 323/343 |
| 3,222,592 | 12/1965 | Kellogg | 323/225 |
| 3,551,799 | 12/1970 | Koppelmann | 323/210 |
| 3,842,342 | 10/1974 | Friedlander et al. | 323/206 |
| 4,210,860 | 7/1980 | Rosa et al. | 323/210 |

FOREIGN PATENT DOCUMENTS

| 1596194 | 7/1970 | France . |
| 1230830 | 5/1971 | United Kingdom . |
| 1238015 | 7/1971 | United Kingdom . |

Primary Examiner—Peter S. Wong
Attorney, Agent, or Firm—Kirschstein, Kirschstein, Ottinger & Israel

[57] ABSTRACT

A polyphase static reactive compensator comprising a main saturated reactor (SR1) connected in series with a number of smaller saturated reactors (SR2–4) of graded voltage rating. The smaller reactors are shunted by respective thyristor switches (TV2–TV4) so that selected combinations of reactors can be obtained to provide control of the overall operating voltage. The slope of the overall characteristic can be controlled by switching through successive reactor combinations. Further refinement of the overall characteristic can be obtained by phase control of the smallest reactor (SR4) thyristor switches (TV3) or, in an alternative form of the invention, by the use of a single reactor (SR1) having a primary winding, a closed mesh secondary winding (19) and a phase-controlled auxiliary reactor (AR, ACR) constituting a load on the closed mesh winding. The two forms of the invention may be combined in one equipment.

14 Claims, 13 Drawing Figures

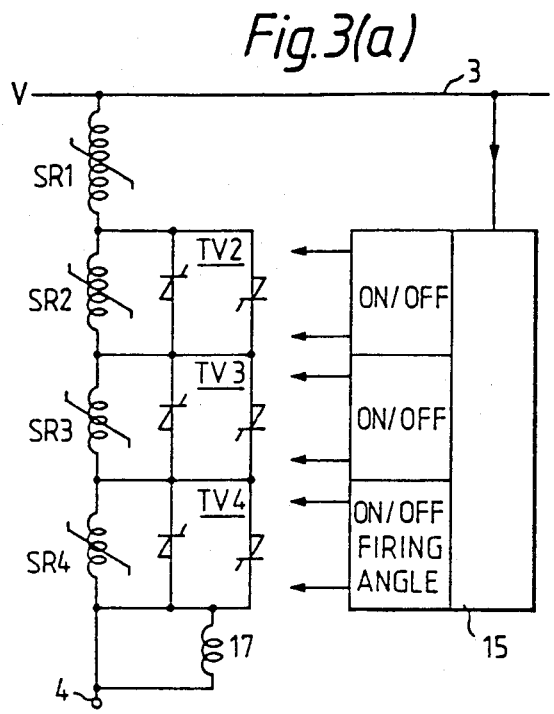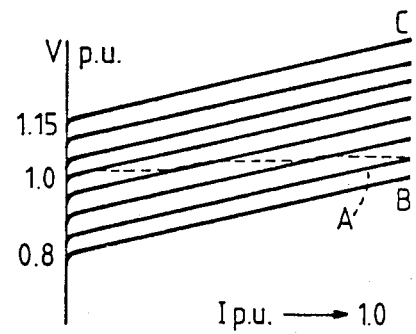

STATIC REACTIVE COMPENSATOR

This invention relates to static reactive compensators for reactive power compensation and voltage control in alternating current (a.c.) transmission systems.

The use of static reactive compensators is now well established, using one of the two alternative key components, i.e., saturated reactors with massive iron cores or air-cored linear reactors controlled by phase-controlled thyristors.

FIG. 1 shows the basic circuit, voltage/current characteristic and waveforms of a typical thyristor-controlled reactor (TCR) system. A linear reactor 1, that is, one with an air rather than an iron core, is connected in series with a thyristor switching arrangement 2 between an a.c. high voltage line 3 and a neutral point 4. The switching arrangement comprises thyristors in inverse parallel to provide conduction in both directions, several thyristors being connected in series in each path to withstand the voltage.

The line voltage V is sensed by a control circuit 5 by way of a stepdown transformer 6, the control circuit adjusting the firing angle a of the thyristors so as to increase the conduction period as the line voltage increases.

Figure 1B:
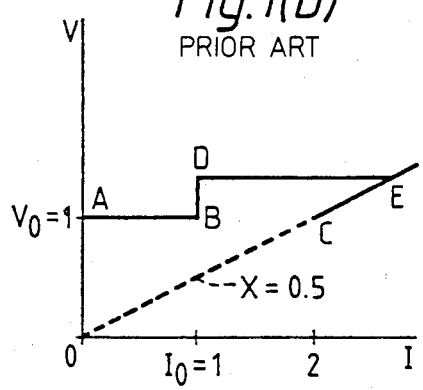
Figure 1C:
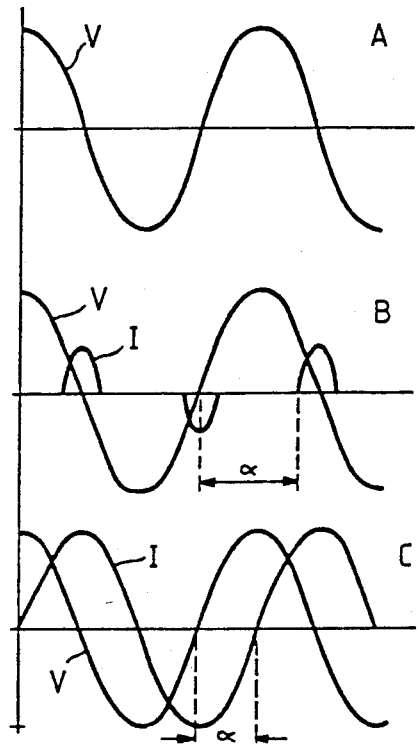

FIG. 1(b) shows the voltage/current characteristic for the circuit of FIG. 1(a). The broken line OC is the characteristic (of constant reactance) that would obtain if the thyristors were fully conducting permanently. However by retarding the firing angle from 90° at point C to 180° at point A the reactance is effectively increased as the current falls and the characteristic AC is obtained. The thyristors may, however, cater for more than the full rated current $I_o$ so that normal operation is on the portion AB. At the point B, a constant current control would operate, producing the characteristic BD, up to the voltage corresponding to point D above which the characteristic shifts to the constant reactance line at and above the point E. FIG. 1(c) shows the voltage and current waveforms for the three points A, B and C.

A known arrangement such as that of FIG. 1 has the advantage over saturated reactors of cheapness but has the considerable disadvantages of a large harmonic current content and thyristors which have to carry fault currents and which therefore have to be down-rated, making them correspondingly more expensive.

Figure 2A:
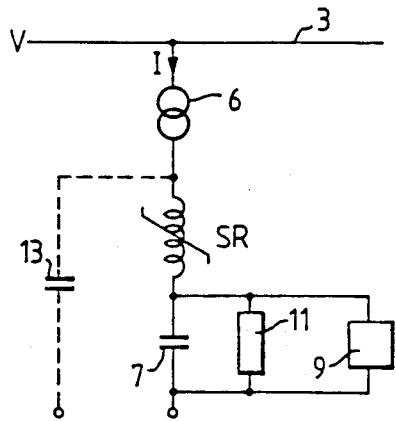
Figure 2B:
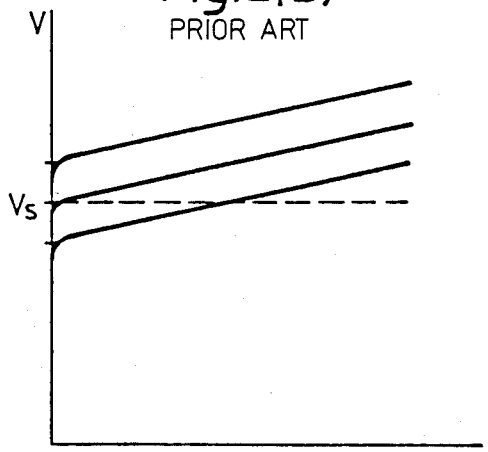

An alternative to, and in fact a forerunner of, the above TCR compensator is the saturated reactor compensator shown in FIG. 2. A saturated reactor SR is connected in series with a slope correcting capacitor 7 between the output of a transformer (6) and a neutral point, the transformer being connected to the supply line and having tap-changing facilities. The saturated reactor has a non-linear characteristic as shown in FIG. 2(b) the main part of which consists of a constant positive slope commencing at a knee point which gives the minimum operating voltage or reference voltage $V_s$. The slope reactance (i.e., the incremental reactance) is reduced still further, towards zero, by the slope correcting capacitor 7 whose negative reactance is chosen to just cancel the positive slope reactance. The solid line shows the uncorrected characteristic and the broken line the corrected version.

Since the saturated reactor is essentially a single voltage device it is necessary to provide a tap changer on the supply transformer to cater for voltages above and below the basic voltage $V_s$. Two such additional characteristics are shown in FIG. 2(b).

The saturated reactor has the advantage of substantially instantaneous and automatic reaction to supply voltage changes. It can also sustain large overloads and can be designed to draw a relatively small proportion of current harmonics. Examples of such harmonically compensated reactors are given in UK Patent Specification Nos. 1303634 and 1545491.

One disadvantage of the saturated reactor is the above mentioned necessity for transformer tap changers to vary the operating voltage range. Another disadvantage is the inability of the associated slope correcting capacitor to sustain overload currents. The capacitor would therefore have to be larger than would be necessary to cope with normal operation, and consequently more expensive. Over-voltage protective equipment 9 and a damping filter 11 is generally employed to avoid the necessity of increasing the size of the capacitor but these measures still incur additional expense and complexity.

A shunt capacitor 13 may be added, across the whole of the basic compensator, to suppress high order harmonics.

Various schemes have been proposed for overcoming the disadvantages inherent in the arrangements of FIG. 1 and FIG. 2. In one such scheme a saturated reactor, without slope correcting capacitor, is supplied from a transformer with separated secondary winding portions. By switching selections of the winding portions in series rapidly by means of thyristors the supply voltage can effectively be changed. The winding portions may be graded so that a fine graduation of supply voltage is accommodated. A 'vertical' shift of the entire S.R. characteristic is thus available and by changing, from one basic SR characteristic (i.e. with significant positive slope) to a lower one, with increasing supply voltage, an approximately zero slope reactance can be obtained. However, the thyristor switching arrangement becomes complex since winding portions cannot be simply short-circuited but must be disconnected. Two sets of thyristors are therefore required.

A somewhat similar scheme is described in UK Patent Specification No. 1238015, in which a reactor has separate winding portions which are selected for series connection in the above manner.

The major difficulty for all such tapchanger schemes in high voltage, high power applications is the large fault current stresses to which the thyristors can be subjected.

In a further scheme a saturated reactor is connected in series with a number of linear reactors which are shunted by thyristors. The resulting characteristic consists of the basic SR characteristic with a slope reactance of increasing magnitude according to the number of linear reactors that are not short-circuited. Slope correction can thus be obtained by switching through the family of characteristics as the supply voltage increases. However, the range of current values available is limited in this scheme by the maximum linear reactance available, and the larger the reactance step the greater the necessary voltage rating of the thyristors.

In addition this scheme does not readily provide a 'vertical' shift of the entire characteristic and increased effective voltage reference settings can only be obtained over successively more restricted ranges of current.

It is therefore apparent that all of the previously proposed static reactive compensator schemes suffer from one disadvantage or another. It is the object of the present invention to provide a static reactive compensator which combines to a large extent the advantages of the various schemes above and alleviates most of the difficulties.

According to the present invention, a polyphase static reactive compensator comprises a plurality of alternating current saturated reactors connected in series between supply terminals, some of said saturated reactors having controllable bypass paths and means for controlling said bypass paths selectively so that a composite voltage/current characteristic can be obtained by short-circuiting said saturated reactors progressively with increasing supply voltage, thus reducing the effective slope impedance.

The plurality of saturated reactors preferably comprises a basic reactor having no bypass path and a number of smaller reactors having respective bypass paths, the impedance of the basic reactor exceeding the total impedance of the smaller reactors.

The smaller reactors may be graded in impedance so that regular step variations of total impedance can be obtained by appropriate combinations of open and closed paths. Each of the saturated reactors may be constructed in a manner to provide suppression of current harmonics.

According to another aspect of the invention, a single saturated reactor may include a primary winding arrangement and a secondary closed mesh winding providing suppression of certain current harmonics in the primary winding arrangement, the mesh winding providing a source of third harmonic voltage for an auxiliary saturated reactor which tends to suppress higher harmonic currents in the primary winding arrangement, the auxiliary saturated reactor being shunted by a controllable bypass path adapted to present a controllable impedance across the auxiliary saturated reactor.

The controllable bypass path may include a linear reactor, and preferably also includes a thyristor switching arrangement.

Figure 5A:
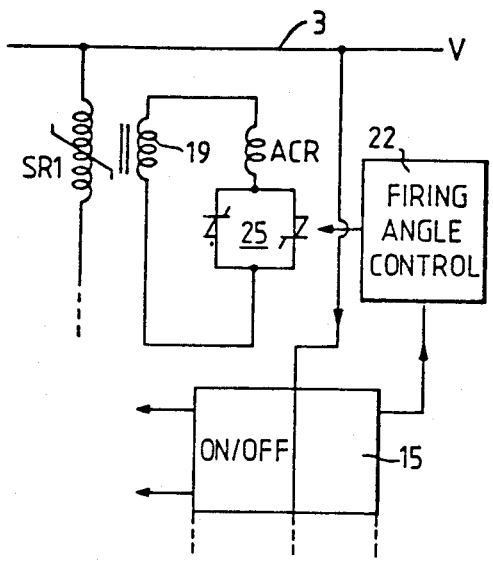
Figure 5B:
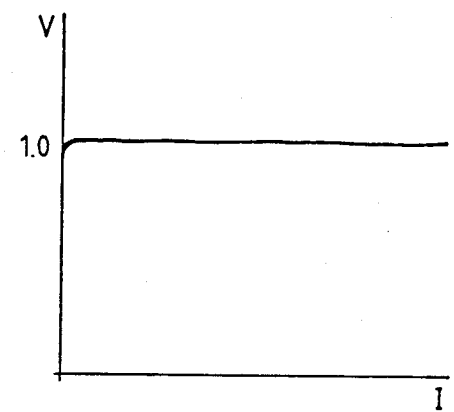
Figure 6A:
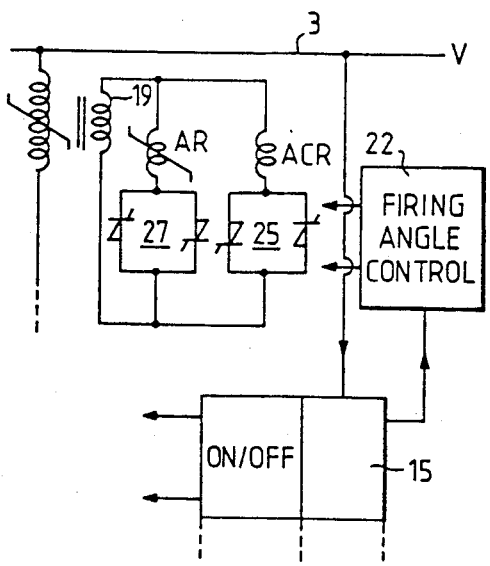

One embodiment, and several modifications, of a static reactive compensator for a high voltage, high power, a.c. transmission system, will now be described, by way of example, with reference to the accompanying drawings, of which:

FIGS. 1(a) (b) and (c) show a known thyristor controlled linear reactor compensation, the characteristic of the reactor, and various operating waveforms respectively;

FIGS. 2(a) and (b) show a known saturated reactor compensator and the associated characteristic;

FIG. 3 shows a basic circuit and characteristic of a compensator in accordance with the present invention, and FIGS. 4, 5 and 6 show modifications of this basic circuit and the associated characteristics.

FIGS. 1 and 2 illustrating prior art proposals have already been described and will not be referred to in any detail.

FIG. 3(a) shows a compensator employing saturated reactors SR1, SR2, SR3 and SR4 connected in series between a high voltage line 3 and a terminal point 4. The drawing shows only a single phase section of the compensator but each reactor is in fact adapted for a three-phase supply and is preferably a treble-tripler harmonically compensated form such as described in UK Patent Specification No. 1303634 or 1545491. The compensator will, however, be described with reference to the single phase arrangement illustrated for reasons of simplicity and clarity.

The saturated reactors are graded in the knee-voltage or saturation reference voltage that they will support. On a basis of rated supply voltage and current as unity, SR1, the basic reactor, conveniently carries 0.8 of the rated supply voltage, i.e., $V_s = 0.8$; SR2 carries 0.2; SR3 carries 0.1; and SR4, 0.05. By connecting selected combinations of these reactors in series a range of reference voltages from 0.8 to 1.15 can be accommodated. Clearly, by providing more reactors, finer graduations and/or a greater range can be achieved.

The basic reactor SR1 is, in the embodiment of FIG. 3(a) left unbypassed and is thus permanently in circuit. Each of the other reactors SR2, 3 and 4 is shunted by a bypass path consisting of two thyristors connected in inverse parallel and constituting a thyristor valve TV2, TV3, and TV4.

The thyristor valves are controlled, by phase control of their firing angles, by a control circuit 15 which senses, and responds to, the supply voltage V.

The lowermost thyristor valve TV4 is shown in series with a linear reactor 17, but this is optional, as will be explained.

By selective 'switching-on' of the thyristor valves TV2, 3 and 4 a range of total reference voltages is available from 0.8 p.u. to 1.15 p.u. in steps of 0.05. The resulting characteristics, ranging from 'B' to 'C', are shown in FIG. 3(b). Since no slope correcting capacitor is used in this embodiment each characteristic has a significant positive slope which therefore limits the range of current drawn by the reactor for a given variation of supply voltage. This disadvantage can, however, be easily overcome by switching from one characteristic to a lower one as the supply voltage increases, as indicated by the composite characteristic 'A' in FIG. 3(b). Thus the two features (1) slope correction and (2) control of the vertical position of the whole characteristic, are both available.

Economies can be made in the number of saturated reactors in applications where only slope correction is necessary.

While each of the reactors is switched wholly in or out of circuit the same degree of harmonic suppression is obtained as is available from the reactors individually.

More continuous control of the composite characteristic A can be obtained by phase control of one of the saturated reactor bypass paths so as to vary, in effect, the reactance of the reactor from zero up to its normal full value. The resultant characteristic can thus be shifted smoothly from B to C by selective switching of the on/off thyristor valves in conjunction with continuous adjustment of the firing angle of the thyristors TV4 in dependence upon the required compensator current.

The partial bypass action tends to distort the current taken by the compensator and thus diminishes the harmonic compensation features of the reactor SR4. The extent of this reduction of compensation is kept to a sufficiently low level by minimising the relative size of the reactor unit being thus controlled (i.e., by choosing SR4) and minimising the degree of the partial conduction of the thyristors as determined by their control phase-angle. This distortion is also reduced to some extent by including a small linear reactor (17) in series in the bypass path.

Referring now to FIGS. 4, 5 and 6 these illustrate modifications to the arrangement of FIG. 3. As mentioned above, the saturated reactors, and particularly the large basic reactor SR1, may be of the harmonically compensated type such as described in UK Patent Specification Nos. 1303634 and 1545491. In such reactors, the windings on each phase are distributed among the nine limbs of a saturable core and in addition the limbs carry a closed mesh winding to provide a path for ninth harmonic currents. This closed mesh winding provides, at appropriate points, a third harmonic voltage which is applied, as explained in those specifications, to an auxiliary saturated reactor. In the accompanying FIG. 4(a) the closed mesh winding 19, magnetically coupled to the primary winding of the saturated reactor SR1, is connected to the auxiliary reactor AR.

In series with the auxiliary reactor AR is a thyristor switch 21 and in parallel with the series combination is a thyristor switch 23. The auxiliary reactor AR can thus be open-circuited or short-circuited, or, by suitable phase control of the switches 21 and 23, set at any intermediate level. The thyristor switches 21 and 23 are controlled by a firing angle control circuit 22 which co-operates with the general control circuit 15 to provide a continuity of control.

FIG. 4(b) shows the effect of control of the auxiliary reactor in this way. With both switches 21 and 23 fully 'off' the reactor AR is open-circuited and the characteristic assumes the form D. With switch 23 fully 'on' (i.e., phase advanced) the reactor AR is short-circuited and the characteristic takes the form E with a drop of the reference voltage of about 10%.

With switch 21 'on' and switch 23 phase controlled, the reactance of the reactor AR is reduced from its full value, and with switch 23 'off' and switch 21 phase controlled, the reactance is increased above its normal full value. The resulting characteristic, F in broken line, can thus be made to adopt any position between D and E.

For normal designs the auxiliary reactor load is chosen to optimise the harmonic compensation features, particularly at the 17th and 19th order, and the level of $V_s$ is only about 3% below the open circuit characteristic D. At the extremes of open or short-circuit these harmonic currents may become as large as 10% of the rated harmonic fundamental frequency current, but at the high harmonic orders involved they are reduced at the compensator terminals by the shunt capacitor bank 13 shown as an optional addition in FIG. 2.

FIG. 5(a) shows an arrangement in which the auxiliary saturated reactor AR is replaced by a linear controlled reactor ACR and series thyristor switch 25. The thyristor switch 25 is phase controlled by the firing angle circuit 22 again in cooperation with the general control circuit 15. By control of the auxiliary linear reactor in this way slope correction as shown in FIG. 5(b) can be obtained.

Figure 6B:
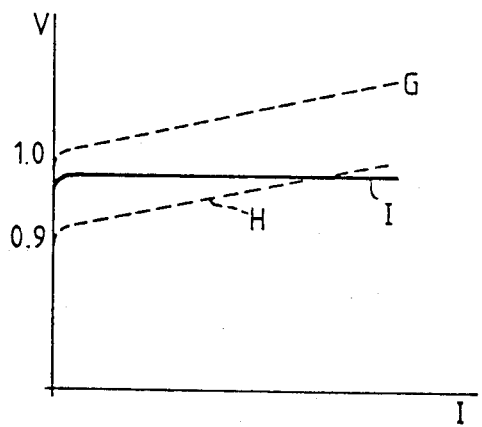

FIG. 6 shows a combination of the two auxiliary reactors with thyristor switches 27 in series with the saturated reactor AR and thyristor switches 25 in series with the linear reactor ACR. The associated characteristics of FIG. 6(b) show the available variation of reference voltage between the broken line characteristics G and H, and the slope correction by the linear reactor to give the characteristic I of controllable reference voltage $V_s$.

The schemes described above retain to a large extent the valuable inherent features of the saturated reactors, such as rapid response, internal harmonic compensation and substantial overload capability; but they provide external control means to enable rapid adjustment of the slope and reference voltage settings of the voltage-current characteristics.

I claim:

1. A polyphase static reactive compensator comprising a plurality of alternating current saturated reactors connected in series between supply terminals, some of said saturated reactors having controllable bypass paths and means for controlling said bypass paths selectively so that a composite voltage/current characteristic can be obtained by short-circuiting said saturated reactors progressively with increasing supply voltage, thus reducing the effective slope impedance.

2. A static reactive compensator according to claim 1, wherein said plurality of saturated reactors comprises a basic reactor having no bypass path and a number of smaller reactors having respective bypass paths, the impedance of said basic reactor exceeding the total impedance of said smaller reactors.

3. A static reactive compensator according to claim 2, wherein said smaller reactors are graded in impedance so that regular step variations of total impedance can be obtained by appropriate combinations of open and closed bypass paths.

4. A static reactive compensator according to any one of the preceding claims, wherein the bypass path of one said saturated reactor is constituted by thyristor valve means, and phase control means are provided to control the conduction angle of the thyristor valve means whereby to control in a gradual manner the impedance of the associated saturated reactor.

5. A static reactive compensator according to claim 4, including bypass control means arranged to control the bypass paths in conjunction with said phase control means so as to provide continuous control of the effective impedance of said saturated reactors.

6. A static reactive compensator according to claim 1 wherein each of said saturated reactors is constructed in a manner to provide suppression of current harmonics.

7. A static reactive compensator according to claim 2, wherein said basic reactor includes a primary winding arrangement and a secondary closed mesh winding providing suppression of certain current harmonics in the primary winding arrangement, said mesh winding providing a source of third harmonic voltage for an auxiliary saturated reactor which tends to suppress higher harmonic currents in said primary winding arrangement, and wherein said auxiliary saturated reactor is shunted by a controllable bypass path adapted to present a controllable impedance across said auxiliary saturated reactor.

8. A static reactive compensator according to claim 7, wherein said controllable bypass path includes a linear reactor.

9. A static reactive compensator according to claim 7 or claim 8, wherein said controllable bypass path includes a thyristor switching arrangement.

10. A static reactive compensator according to claim 2, wherein said basic reactor includes a primary winding arrangement and a secondary closed mesh winding providing suppression of certain current harmonics in the primary winding arrangement, said mesh winding providing a source of third harmonic voltage, and wherein a linear reactor in series with a phase-controlled thyristor switching arrangement is connected as a load on said mesh winding.

11. A polyphase static reactive compensator comprising an alternating current saturated reactor having a primary winding arrangement and a secondary closed mesh winding providing suppression of certain current harmonics in the primary winding arrangement, said mesh winding providing a source of third harmonic voltage for an auxiliary saturated reactor which tends to suppress higher harmonic currents in said primary winding arrangement, and wherein said auxiliary saturated reactor is shunted by a controllable bypass path adapted to present a controllable impedance across said auxiliary saturated reactor.

12. A static reactive compensator according to claim 11, wherein said auxiliary saturated reactor is connected in series with phase-controlled thyristor switching means to control the impedance of the auxiliary saturated reactor between its normal value and open circuit.

13. A static reactive compensator according to claim 11 or claim 12, wherein said controllable bypass path includes a linear reactor.

14. A static reactive compensator according to claim 13, wherein said controllable bypass path includes a linear reactor in series with phase-controlled thyristor switching means.

* * * * *